United States Patent

[11] 3,591,275

| [72] | Inventors | Frank C. Badalich;<br>George F. Krtous, both of Chicago, Ill. |
|------|-----------|---------------------------------------------------------------|
| [21] | Appl. No. | 735,730 |
| [22] | Filed | June 10, 1968 |
| [45] | Patented | July 6, 1971 |
| [73] | Assignee | Bell & Howell Company<br>Chicago, Ill. |

| [54] | SLIDE PROJECTOR<br>8 Claims, 3 Drawing Figs. | |
|------|----------------------------------------------|----|
| [52] | U.S. Cl. | 353/21,<br>353/113 |
| [51] | Int. Cl. | G03b 21/00,<br>G03b 23/00 |
| [50] | Field of Search | 353/21, 113 |

[56] References Cited
UNITED STATES PATENTS

| 2,496,724 | 2/1950 | Host | 353/21 |
| 3,143,037 | 8/1964 | Jungjohann | 353/21 |

FOREIGN PATENTS

| 722,934 | 12/1965 | Canada | 353/21 |

Primary Examiner—Harry N. Haroian
Attorney—William F. Pinsak

ABSTRACT: A slide projector having a previewing feature and having provision for sequentially moving each slide from a previewing stage directly into a projection stage. A slide received into the projector is first previewed, reoriented if necessary, returned to the projector at the preview station, and then transported within the projector to the projection station. After projection, the slide is removed from the projector at a removal station.

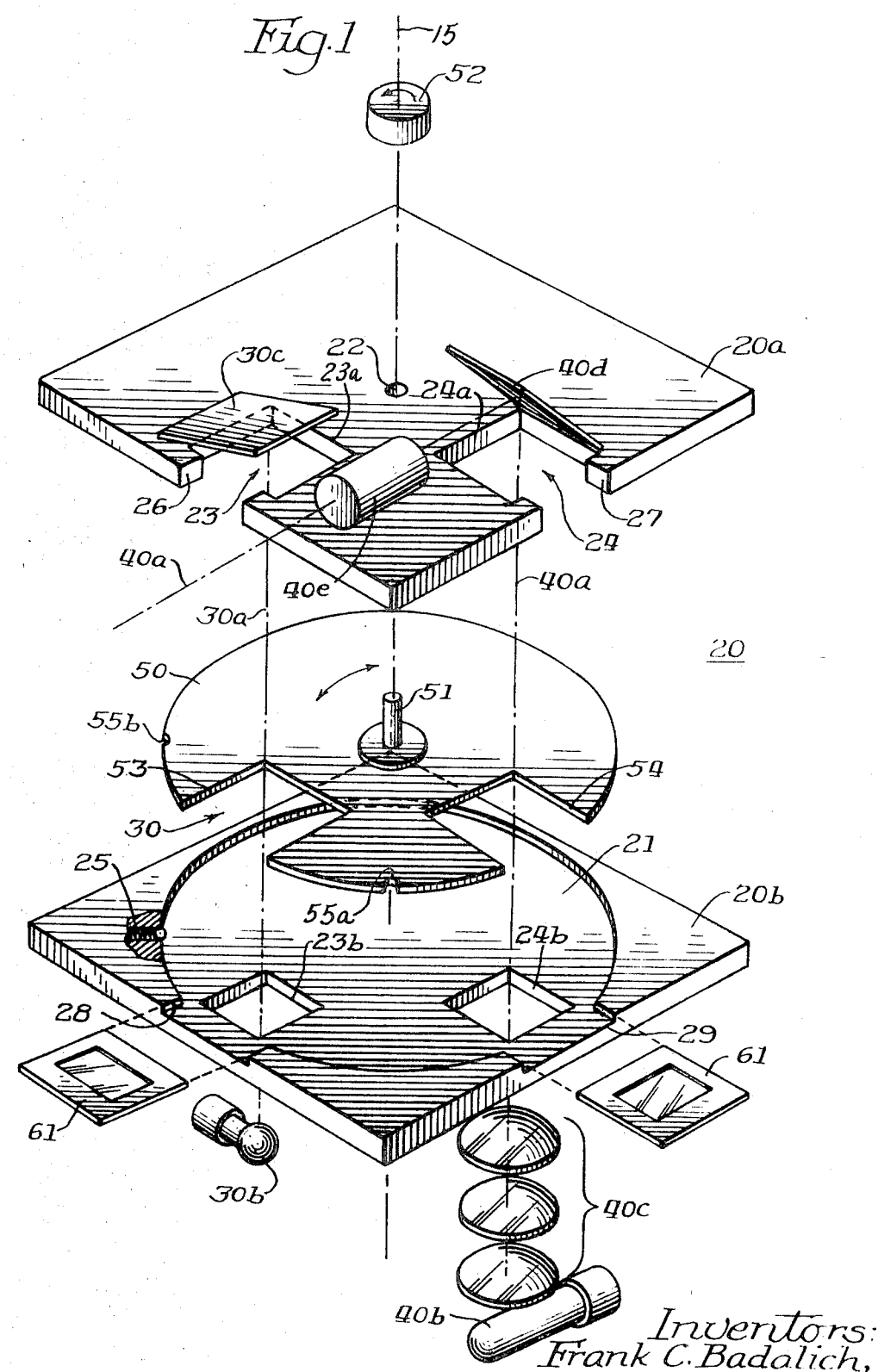

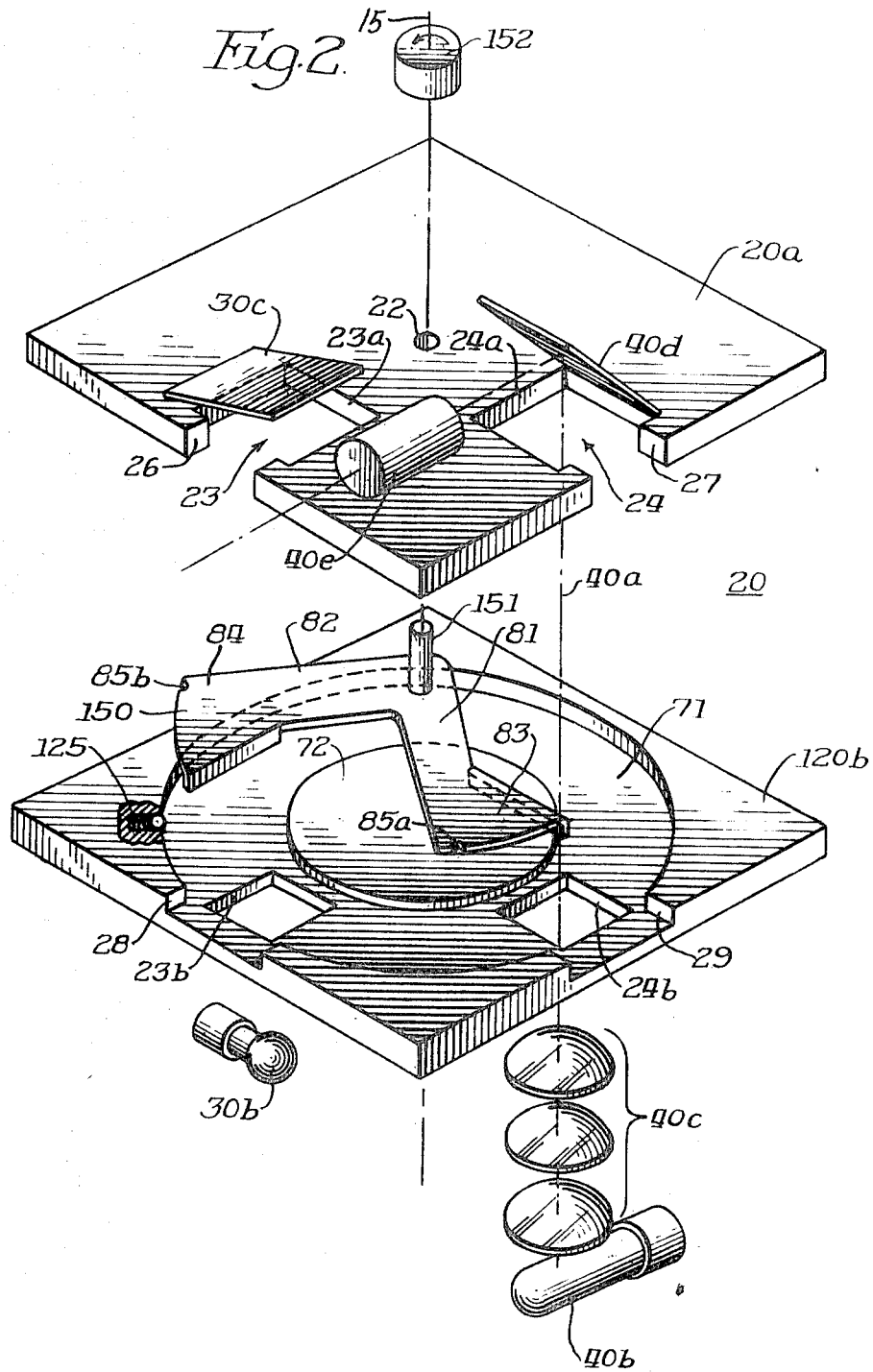

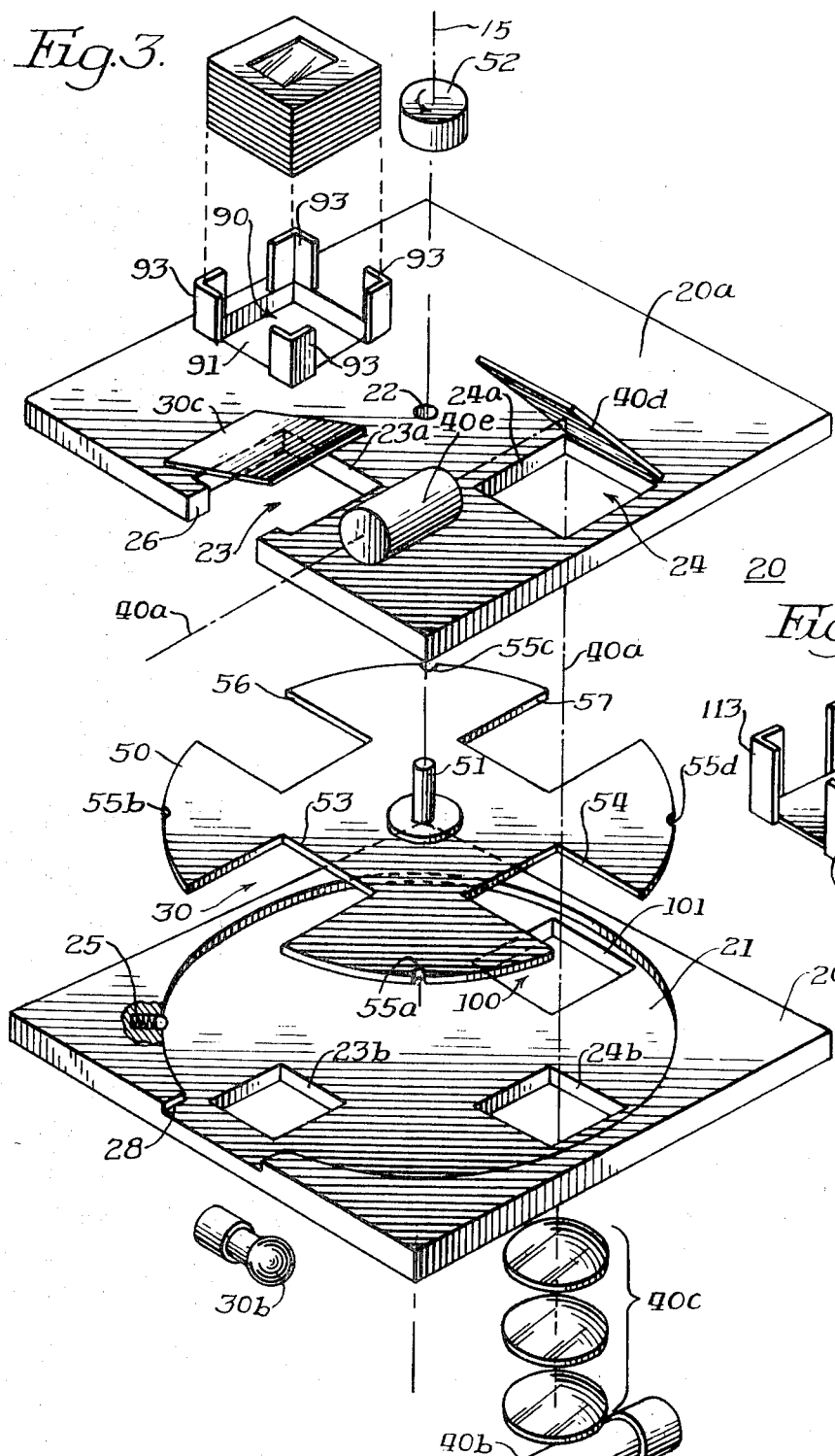

SLIDE PROJECTOR

This invention relates to slide projectors, more particularly to slide projectors of the type providing for the previewing of slides immediately prior to projection.

Heretofore available slide projectors having a previewing feature have employed a parallel slide feed arrangement in which slides are taken from a tray two at a time and one of the slides is positioned for previewing and the other is positioned for projection. Thereupon one slide may be projected while the immediately succeeding slide is previewed. After the preview and project operation, both slides are removed back to the tray, the tray is indexed, and the cycle repeated. Such an arrangement requires not only specially designed and constructed trays adapted for parallel access by the machine, but also mechanism within the projector including elaborate and complex transport equipment which not only adds to the expense of the machine but also fosters operating problems.

It is an object of this invention to provide a slide projector having a previewing feature which is more simple and compact than those presently available.

It is another object of this invention to provide a slide projector having a previewing feature in which the slides are moved sequentially in a path in a common plane through a previewing station to the projection station.

It is another object of this invention to provide a slide projector having a previewing feature which moves the slides sequentially through the previewing station directly into the projection station while providing the facility at the previewing station to permit reorientation of the film slide should it be disarranged for proper projection.

It is a further object of the invention to provide a low-inertia slide projector having a previewing feature in which the forces of gravity are relied upon both to feed slides into and out of the projector and in which the only energy dissipated on the slide is that of moving it in a horizontal plane from the slide feed-in station through a previewing station and a projection station and then into the slide removal station.

It is another object of this invention to provide a slide projector having a previewing feature having the foregoing characteristics which will be efficient in use, durable, and which can be manufactured for a reasonable cost.

Further and other objects will be apparent from the description of the accompanying drawings in which like numerals refer to like parts.

In the drawings:

FIG. 1 is a exploded view in perspective of an exemplary arrangement in accordance with the invention;

FIG. 2 is a exploded view in perspective illustrating a slightly modified form of the arrangement shown in FIG. 1;

FIG. 3 is an exploded view in perspective of a more detailed projector arrangement, similar to that shown in FIG. 1; and FIG. 4 is a perspective view of a slide retainer for use with the projector arrangement of FIG. 3.

Turning to the drawings, there is shown in FIG. 1 a projector arrangement made up of a housing 20 here represented by an upper housing plate 20a and a lower housing plate 20b. Associated with housing 20 is previewer structure 30 aligned along a previewer axis 30a and including an illumination source 30b and a viewing plate 30c. Further, the arrangement includes an image projection structure aligned along an optical axis 40a and including projector lamp 40b, condensing lenses 40c, projection mirror 40d, and projection lens 40e.

Upper housing plate 20a includes previewer aperture 23a which is centered on previewer axis 30a and projector aperture 24a which is centered on optical axis 40a. Lower housing plate 20b includes circular depression 21 in which is contained previewer aperture 23b and projection aperture 24b. Previewer aperture 23b is the counterpart to aperture 23a in upper housing plate 20a and is also centered on previewer axis 30a. Similarly, projector aperture 24b is the counterpart to aperture 24a in upper housing plate 20a and is centered on optical axis 40a.

Also illustrated in FIG. 1 is a slide carrier in the form of transport disc 50, shaped so as to ride within depression 21 formed in housing plate 20b, which transport disc has fixed thereto drive shaft 51, here shown to be extendable through bushing 22 in upper housing plate 20a and to be capped by transport driving knob 52. Transport disc 50 is freely rotatable about vertical axis 15 that passes through the housing 20 by use of driving knob 52 and includes therein two cutouts 53 and 54, spaced apart on the periphery of disc 50 so as to be simultaneously alignable with previewer axis 30a and optical axis 40a.

Cooperating between lower housing plate 20b and transport disc 50 is spring loaded detent 25, placed on the outer periphery of depression 21. Smooth notches 55a and 55b in transport disc 50 are arranged so as to cooperate with detent 25 to align either of the cutouts 53 or 54 with either of axes 30a or 40a.

The aperture pairs 23a–23b and 24a–24b are sized so as to be smaller in extreme dimension than a standard mounted photographic slide and so as to be at least as large as the photographic image area of a mounted slide. Cutouts 53 and 54 are sized to the extreme dimension of a mounted photographic slide so as to receive a slide therein for transport between the previewing station and the projection station.

To facilitate the feeding of slides into and out of the carrier, upper housing plate 20a is provided with channel 26 extending between aperture 23a and the outer perimeter of the housing and with channel 27 extending between aperture 24a and the outer perimeter of the housing. These channels may be, but are not necessarily, the full width of a mounted photographic slide.

Cooperating with channels 26 and 27, respectively, are horizontal slots 28 and 29, in lower housing plate 20b, extending between the outer perimeter thereof and depression 21 at apertures 23b and 24b, respectively. Slots 28 and 29 are dimensioned to correspond to the width of a mounted photographic slide and to be of such depth as to provide direct access of the slide into cutouts 53 and 54 of disc 50.

From the description of the foregoing embodiment of the invention, it will be seen that transport disc 50 is nested in depression 21 in lower housing plate 20b. Upper plate 20a is secured to lower housing plate 20b with shaft 51 extending through aperture 22 and with driving knob 52 securely fixed thereto for freely rotating transport disc 50 about vertical axis 15 within depression 21 of closed housing 20. In the arrangement shown, aperture pairs 23a and 23b define previewing station 23 and aperture pairs 24a and 24b define projection station 24. Upon turning of knob 52, transport disc 50 is rotatable through a full 360° with detent 25 in lower housing plate 20b operating to effect alignment of cutout 54 in transport disc 50 with previewing station 23 by release of detent 25 into notch 55a. Upon further rotation of disc 50, in a counterclockwise direction, cutout 54 is placed in alignment with projection station 24 and cutout 53 is placed in alignment with previewing station 23 by release of detent 25 into notch 55b.

Detent pressure is designed to be light, so that the application of but a slight additional force over that normally necessary to rotate transport disc 50 will cause rotation beyond detent 25 at either of notches 55a or 55b. It is also to be understood that, for purposes of illustration, the principle of the invention has been shown in its simplest form and that disc 50 may obviously be driven by means other than by hand.

In the preferred mode of operation, cutout 54 of transport disc 50 is first aligned with previewing station 23. Thereupon, a horizontally oriented slide 61 can be inserted into the housing through slot 28 to be received in cutout 54 at station 23. Illumination of lamp 30b from a power source, not shown, will, in turn, illuminate this slide itself and permit viewing thereof through viewing plate 30c. If disoriented for proper viewing, the slide may be removed from previewing station 23 through slot 28 by access provided at channel 26 in upper housing plate 20a. The slide may then be reoriented for proper viewing and reinserted into station 23. Transport disc 50 may then be rotated by use of drive knob 52 to move cutout 54 and horizontally oriented slide 61, then contained therein, through one-quarter of a turn to projection station 24. In that position, illumination from projection lamp 40b, energized by a suitable power source, not shown, along optical axis 40a and through condenser lens system 40c will illuminate the horizontally oriented slide at projection station 24 and produce an image which is reflected at mirror 40d through projection lens 40e. Projection lens 40e, supported in a mounting and manner not shown, is adjustable along optical axis 40a to achieve focus of the image at a remote projection screen, also not shown. After projection, the slide may then be removed from projection station 24 through channel 27 and slot 29. It is apparent from the circular motion of the slide 61 that previewing station 23 and projection station 24 are equispaced from vertical axis 15.

Simultaneous with projection at station 24, another slide may be inserted into previewing station 23, viewed through plate 30c, reoriented if necessary, and prepared for subsequent projection at station 24.

FIG. 2 illustrates a modification of the arrangement shown in FIG. 2 wherein lower housing plate 20b and transport disc 50 are shown in different configuration. In the arrangement of FIG. 2, the lower housing plate is identified by the reference character 120b. Modified plate 120b includes therein flat annular depression 71 surrounding circular island 72. Annular depression 71 defines a race of a width sufficient to accept a horizontally oriented mounted photographic slide for transport along a circular path between previewing station and projection station 24.

A slide carrier in the form of transport frame 150, which includes arms 81 and 82 and is rotatable about vertical axis 15 by means of shaft 151 and driving knob 152, is substituted for transport disc 50. Arm 81 is provided with end portion 83 of a thickness and configuration to fit within race 71. Similarly, arm 82 has end portion 84 of a thickness and configuration to fit within race 71. End portions 83 and 84 are provided with notches 85a and 85b, respectively, to cooperate with detent 125.

In this arrangement, it is obvious that island 72 is made to be of a thickness slightly less than the depth of race 71 at the outer sidewall, thereby to permit ease of movement of end portions 83 and 84 of transport frame 150 in race 71.

The operation of the arrangement shown in FIG. 2 is exactly the same as that illustrated with regard to FIG. 1, except in this instance transport frame 150 does not capture the slide, but merely acts to push it along a circular path from previewing station 23 to projection station 24.

Turning now to FIG. 3, the arrangement illustrated is similar to that shown in FIG. 1, except that upper housing plate 20a is modified to include slide-receiving station 90 defined by aperture 91, and lower housing plate 20b is modified to include slide removal station 100 defined by aperture 101. Transport disc 50 differs from that which is shown in FIG. 1 in that it includes, in addition to cutouts 53 and 54, cutouts 56 and 57. Thus, in the arrangement shown in FIG. 3, slide-receiving station aperture 91, station apertures 23a and 23b, station apertures 24a and 24b, and slide removal station aperture 101 are situated in quadrants spaced apart by 90° and are equispaced from vertical axis 15. Correspondingly, cutouts 53, 54, 56 and 57 of transport disc 50 are arranged in quadrants spaced apart by 90° so as to register with the respective apertures in housing plates 20a and 20b as transport disc 50 is rotated about vertical axis 15 and oriented by operation of detent 25 recessing into notches 55a, 55b, 55c and 55d.

Slide-receiving station aperture 91 is of a dimension to receive mounted photographic slides which drop by gravity into cutouts 53, 54, 56 and 57 of transport disc 50. Disc 50 is made to be of a thickness such that only one slide at a time will be received within a selected cutout.

The corners of slide-receiving station aperture 91 may be built up as with retainers 93, as shown in FIG. 3, thereby to accommodate a plurality of slides in a stack at slide-receiving aperture 91 for feed into projector housing 20. Obviously, other methods of placing the slides in position may be utilized.

Slide removal station aperture 101 in lower housing plate 20b is of the same dimension as slide-receiving station aperture 91 so as to permit slides moved to that station by operation of transport disc 50 to drop through the plate and thereby to be removed from the projector housing. To accommodate the slides discharged through aperture 101, the underside of lower housing plate 20b may have affixed thereto, in alignment with aperture 101, slide-retaining tray 110, as shown in FIG. 4. The slide retainer may be of any suitable form, but as shown here, it includes bottom plate 111 and four upstanding corner angles 112, 113, 114 and 115, at which the tray is affixed to the underside of lower housing plate 20b in a suitable manner, not shown. The tray may be permanently fixed or be removable. If fixed, corner angles 114 and 115 may be cut off on one side on the upper edge, thereby to permit removal of the slides received in the tray.

Operation of the arrangement shown in FIG. 3 is substantially the same as that described in FIG. 1 except that in this instance the slides are fed into and unloaded from the carrier at separate stations specifically designed for such operation. Accordingly, aperture 24a in upper housing plate 20a need not be provided with channel 27, nor need lower housing plate 20b be provided with slot 29 at projection aperture 24b. Thus, a slide at slide-receiving station 90 is received, for example, in cutout 56 of transport disc 50 and transported along a circular path to previewing station 23 upon rotation about vertical axis 15 of the disc in a counterclockwise direction. There the slide is previewed at plate 30c. At the same time, cutout 57 is advanced to slide-receiving station 90, and, assuming a supply of slides at the slide-receiving station, a second slide is received in cutout 57.

If the slide at previewing station 23 is improperly oriented for projection, it may be removed through channel 26 and slot 28, reoriented, and then reinserted. Thereupon transport disc 50 is again advanced by rotation of driving knob 52 in a counterclockwise direction until the first slide is aligned with projection station 24. At this same time, another slide is introduced to cutout 54 of transport disc 50 at slide-receiving station 90. The slide at projection station 24 is then projected onto an external screen in the manner previously described with regard to FIG. 1.

Transport disc 50 is then advanced into the next quadrant, at which time the projected slide will be moved from projection station 24 to slide removal station 100 and fed out of the disc through aperture 101 into slide-retaining tray 110. At the same time, another slide will be fed into the disc at slide receiving station 90, a slide will be in previewing position at preview station 23 and a slide will be in projection position at projection station 24. Transport disc 50 is continuously rotated in a manner as described until all of the slides presented at slide-receiving station 90 have been transported along a circular path through the previewing and projection stations 23, 24 and removed from the housing at slide removal station 100.

The arrangement of the present invention has been illustrated in its most fundamental form for ease of understanding. It is obvious that, in practice, housing 20 is supported on a base to permit mounting and enclosure of lamps 30b and 40b as well as condensing lens unit 40c at the underside of lower housing plate 20b. Further, viewing plate 30c, mirror 40d and projection lens 40e are suitably secured to and enclosed over upper housing plate 20a.

As it is immediately obvious that transport disc 50 can be driven with equal ease by shaft 51 extending downwardly through lower housing plate 20b, it is also obvious that the same could be moved manually or be driven by a motor also accommodated within the face or on the upper surface of housing 20, suitably enclosed.

The illustrated previewing station structure is exemplary and may be suitably modified to accommodate the purposes of the user. This may include means for merely illuminating a slide or means for projecting a magnified image on a plate. It should be obvious that, although the device has been illustrated with disc movement in a counterclockwise direction, the disc may as readily be configured, with appropriate modification, to rotate in a clockwise direction. Also, while the arrangement of the present invention is shown to accommodate itself to the horizontal transport of slides between receiving station and a removal station, it is obvious that the arrangement will function to the same purpose in a vertical orientation.

From the foregoing, it is clear that there has been presented herewith an improved slide projector, having a previewing feature, which is arranged for sequentially moving each slide through a previewing stage and then directly into a projection stage. In its fundamental concept, a slide received into the projector is first previewed in the projector, reoriented if necessary, and then moved to projection without any additional handling. After projection, the slide is removed from the projector at a removal station which may or may not be coincident with the projection station.

In its preferred form, slide movement between stations is accomplished in a horizontal plane, thereby easily adapting the projector for gravity feed of slides into and out of the projector. Not only are the mechanical requirements for such a projector made simple but also, due to the reduced handling, the slides are subjected to fewer variants and thereby tend to achieve a longer useful life.

It is to be understood that the embodiments shown are illustrative of the principal operation of a slide projector having a previewing feature and wherein slides are moved sequentially from a previewing station directly to a projection station and that certain changes, alterations, modifications or substitutions can be made in the structure of the device without departing from the spirit and scope of the claims.

What we claim is:

1. A slide projector comprising:
    a horizontally disposed lower housing plate including a previewing aperture, a projection aperture, and an exit aperture disposed in that order at three quadrants of a circular path;
    a horizontally disposed carrier including four equispaced slide-receiving means, said carrier being mounted for rotation such that each of said receiving means traverse said circular path and sequentially overlie said previewing, projection and exit apertures in said lower housing plate during rotation;
    said previewing and projection apertures being of a size and disposition to prevent a slide traversing said circular path from falling through those apertures, but said exit aperture being of a size and disposition to permit a slide traversing said circular path to fall therethrough; and
    a horizontal upper housing plate overlying said carrier and including previewing and projection apertures in registry with said previewing and projection apertures in said lower housing plate;
    said upper housing plate further including a slide supply aperture disposed above a point on said circular path between said previewing and exit apertures in said lower housing plate such that unidirectional rotation of said carrier may carry a slide sequentially from said supply aperture to said previewing apertures to said projection apertures and finally to said exit aperture for ejectment from said slide projector.

2. A slide projector including:
    a housing;
    means within said housing defining a previewing station;
    means within said housing defining a projection station;
    means for projecting a horizontally oriented slide at said projection station;
    said previewing station and said projection station being spaced from one another and being equispaced from a vertical axis passing through said housing; and
    carrier means rotatable about said vertical axis for transporting horizontally oriented slides from said previewing station to said projection station along a substantially circular path.

3. The slide projector set forth in claim 2 wherein said means defining a previewing station also define a slide-receiving station whereat a horizontally oriented slide may be received by said carrier means.

4. The slide projector set forth in claim 3 wherein said means defining a projection station also define a slide removal station whereat a horizontally oriented slide may be removed from said carrier means.

5. A slide projector including:
    a housing;
    means within said housing defining a slide-receiving station;
    means within said housing defining a previewing station;
    means within said housing defining a projection station;
    means for projecting a horizontally oriented slide at said projection station;
    said slide-receiving station, said previewing station, and said projection station being both spaced from each other and equispaced from a vertical axis passing through said housing; and
    carrier means rotatable about said vertical axis for transporting horizontally oriented slides from said slide-receiving station to said projection station through said previewing station along a substantially circular path.

6. A slide projector including:
    a housing;
    means within said housing defining a slide-receiving station;
    means within said housing defining a previewing station;
    means within said housing defining a projection station;
    means for projecting a horizontally oriented slide at said projection station;
    means within said housing defining a slide removal station;
    said slide-receiving station, said previewing station, said projection station and said slide removal station being both spaced from each other and equispaced from a vertical axis passing through said housing; and
    carrier means rotatable about said vertical axis for transporting a horizontally oriented slide from said slide-receiving station to said slide removal station through said previewing station and said projection station along a substantially circular path.

7. The slide projector set forth in claim 6 further including means formed in said housing for permitting the removal of a slide from said previewing station.

8. A slide projector including:
    a housing;
    means within said housing defining a slide-receiving station;
    means for supporting a stack of horizontally oriented slides over said slide-receiving station;
    means within said housing defining a previewing station;
    means within said housing defining a projection station;
    means for projecting a horizontally oriented slide at said projection station;
    means within said housing defining a slide removal station;
    means for retaining a stack of slides under said slide removal station;
    said slide-receiving station, said previewing station, said projection station and said slide removal station being both spaced from each other and equispaced from a vertical axis passing through said housing; and
    carrier means rotatable about said vertical axis for transporting a horizontally oriented slide from said slide-receiving station to said slide removal station through said previewing and projection stations along a circular path, whereby slides are gravitationally fed one at a time to said carrier means at said slide-receiving station, previewed, projected, and gravitationally removed from said carrier at said slide removal station by falling into said retaining means.